United States Patent [19]
Kay et al.

[11] Patent Number: 4,684,715
[45] Date of Patent: Aug. 4, 1987

[54] EXTRACTION OF RUBBER AND/OR RESIN FROM RUBBER CONTAINING PLANTS WITH A MONOPHASE SOLVENT MIXTURE

[75] Inventors: Edward L. Kay, Akron; Richard Gutierrez, Canal Fulton, both of Ohio

[73] Assignee: The Firestone Tire & Rubber Company, Akron, Ohio

[21] Appl. No.: 745,764

[22] Filed: Jun. 17, 1985

Related U.S. Application Data

[63] Continuation of Ser. No. 607,493, May 7, 1984, abandoned.

[51] Int. Cl.$^4$ ................................................ C08C 4/00
[52] U.S. Cl. .................................... 528/493; 528/491; 528/494; 528/495; 528/496; 528/497; 528/498; 528/930

[58] Field of Search ............... 528/491, 493, 494, 495, 528/496, 497, 498, 930

[56] References Cited

U.S. PATENT DOCUMENTS 2,390,860 12/1945 Williams .............................. 528/930
2,572,046 10/1951 Meeks et al. ........................ 528/930
4,136,131 1/1979 Buchanan ............................ 528/930
4,405,532 9/1983 Gutierrez et al. .................. 524/253

FOREIGN PATENT DOCUMENTS 039910 11/1981 European Pat. Off. .

Primary Examiner—Christopher Henderson
Attorney, Agent, or Firm—D. N. Hall

[57] ABSTRACT

A process for extracting rubber and/or resin from rubber containing plants such as guayule utilizing a monophase mixture of an organic polar solvent and a hydrocarbon solvent.

10 Claims, No Drawings

EXTRACTION OF RUBBER AND/OR RESIN FROM RUBBER CONTAINING PLANTS WITH A MONOPHASE SOLVENT MIXTURE

This application is a continuation of application Ser. No. 607,493, filed May 7, 1984, now abandoned.

TECHNICAL FIELD

The present invention relates to a process utilizing a monophase solvent for extracting rubber and/or resin from ground plants containing rubber.

BACKGROUND ART

Heretofore, rubber was recovered from guayule plants by the water flotation process which involved parboiling the shrub to help coagulate the latex and minimize loss of latex during wet milling of the shrub in a pebble mill. The parboiling also aided in removal of dirt and leaves. The crude rubber would be recovered via a water flotation process which involved allowing the crude rubber to float on the surface of the water and subsequently collecting the crude rubber by various means.

An improved method involved the fine grinding of a water slurry containing rough ground guayule, as ground in a pulping mill to rupture a greater percentage of the cells containing the rubber latex, with recovery of crude rubber by the water flotation process. However, the efficiency of the water flotation process does vary with the variety of guayule shrub used as well as the general condition of the shrub. Hence, yield of rubber will vary over a considerable range. In addition, fine grinding in a pulping mill so effectively released the rubber and coagulated the rubber that at times the grinding plates were fouled.

To overcome the variability of the efficiency of the water flotation process, attempts were made to treat the crushed guayule shrub with solvents to effect dissolution of the rubber or resin with subsequent recovery of the rubber or resin from the respective solution. These attempts involved percolation which involved passage of solvent through a bed of guayule shrub to remove the desired rubber by dissolution. Guayule resin can be efficiently recovered by solvent percolation; however because of the high viscosity of the rubber solution, percolation by gravity flow rapidly compacted the bed of ground shrub resulting in failure of the gravity percolation process.

Still another method of recovering the rubber or resin involved subjecting the plant materials to a simultaneous action of compressive and shear forces under nonaqueous conditions, wherein said forces are sufficient to reduce said fiberous plant material to comminuted fiberous matter and, thereby, release polymeric hydrocarbon substances. The comminuted fiberous matter and polymeric hydrocarbon substances would cohere into a plastic mass. The plastic mass was then shaped into particles, and polymeric hydrocarbon substances extracted therefrom with a solvent. However, this method, as set forth in U.S. Pat. No. 4,136,131, related to open milling of the guayule shrub as well as size reduction in an extruder and, thus, would expose the ground shrub to the deleterious effects of air contact unless the operations were conducted in an inert atmosphere.

Moreover, this procedure to form preshaped particles of comminuted guayule shrub involved an additional step since the preshaped particles are then extracted via a percolation process.

Many variations of the percolation and immersion processes are possible but no known previous procedure reports the simultaneous recovery of rubber and resin via dissolution in an appropriate solvent.

Another method of recovering rubber or resin was to immerse the crushed guayule shrub in a solvent to effect dissolution and subsequently recovering the solution of rubber or solution of resin. This procedure would avoid the compacting of the shrub bed experienced with solvent percolation to recover rubber. This procedure is commonly called an immersion process.

U.S. Pat. No. 2,390,860 relates to using for extraction a resin solvent as a resin solvent with a small amount of a rubber solvent such that the mixture is not a rubber solvent. This patent is not pertinent in that it relates to using a material obtained via a water flotation process. U.S. Pat. No. 2,572,046 relates to an extraction method having a separate water-miscible, organic solvent phase, and a separate hydrocarbon solvent phase. Hence, in relating to two different phases, it is not pertinent. Moreover, none of these patents suggests the use of a monophase mixture of solvents, or to the formation of a slurry therewith and the extraction of rubber and/or resin therefrom.

DISCLOSURE OF INVENTION

Therefore, it is an aspect of the present invention to provide a process for removing rubber and/or resin from rubber containing plants.

It is a further aspect of the present invention to provide a process for removing rubber and/or resin, as above, wherein a monophase solvent mixture is utilized.

It is a still further aspect of the present invention to provide a process for removing rubber and/or resin, as above, wherein the recovery yield of said rubber and/or resin is generally at least 70 percent.

It is yet another aspect of the present invention to provide a process for removing rubber and/or resin as above wherein said solvent mixture contains from about 10 percent to about 50 percent by weight of an organic polar solvent and from about 50 percent to about 90 percent by weight of a hydrocarbon solvent.

In general, a process for extracting rubber and/or resin from rubber containing plants comprising the steps of:

adding a monophase solvent to particles of the rubber containing plant, said monophase solvent comprising at least one hydrocarbon solvent, and at least one organic polar solvent, the amount of said hydrocarbon solvent ranging from about 95 to about 50 percent by weight and the amount of said organic polar solvent ranging from about 5 to about 50 percent by weight.

BEST MODE FOR CARRYING OUT THE INVENTION

According to the concepts of the present invention, a high recovery yield of rubber and/or resin is obtained by utilizing a monophase solvent mixture.

In order to utilize the present invention, a rubber containing plant is initially broken down in size, i.e. shredded, ground, cut, crushed and the like into small pieces, as for example, less than 1.0 inches in length and usually about ⅛" in length. Generally, any conventional apparatus can be utilized such as a hammer mill. A suitable crush grinding step involves the use of a double stage hammer mill such that the particles egressing from the first hammer are fed to the second hammer mill. In this matter, the entire plant, including leaves, can be fed whole to the mill. This has the advantage of recovering the resin and wax in the leaves.

To the small particles of rubber containing plant is added a monophase solvent. By monophase is meant that the solvent system at the temperature of extraction and at the proportions employed is a single liquid phase; in other words, the constituent solvents are miscible under these conditions. The monophase solvent of the present invention comprises one or more polar solvents as well as one or more hydrocarbon solvents. The hydrocarbon solvent can be a alkane having from 4 to 9 carbon atoms, such as heptane, nonane, and the like with hexane being preferred. Other solvents include the cycloalkanes having from 5 to 10 carbon atoms, such as cyclohexanes, cyclopentanes, and the like. The aromatics or alkyl substituted aromatics can also be utilized such as those having from 6 to about 12 carbon atoms, for example benzene, xylene, toluene and the like. The organic polar solvents include alcohols having from 1 to 8 carbon atoms such as ethanol, isopropanol, and the like. The esters having from 3 to 8 carbon atoms can also be utilized such as various formates, various acetates, the various proprionates, and the like. The various ketones having from 3 to 8 carbon atoms can be utilized such as acetone, methyl ethyl ketone, and the like. Ethers can also be utilized such as those having from 2 to 8 carbon atoms including dimethyl ether, diethyl ether, and the like, as well as cyclic ethers having from 4 to 8 carbon atoms such as tetrahydrofuran.

The amount of the one or more organic polar solvent in the monophase solvent ranges from about 5 to about 50 percent by weight, more specifically from about 10 to about 45 percent by weight, desirably from about 15 to 40 percent by weight and preferably from about 25 to about 35 percent by weight. Accordingly, the one or more hydrocarbon solvents constitute the remaining amount, that is from about 95 to 50 percent, or specifically from about 90 to about 55 percent, desirably from about 85 to about 60 percent and preferably from about 75 to about 65 percent by weight.

The above described monophase solvent system is used to extract rubber and/or resin from rubber containing plants, for example guayule, and to yield the desired resinous rubber as a residue. This resinous rubber can be used in certain applications without further processing (except for the addition of conventional adjuvants, fillers and the like) or it can be processed by further extraction, heating, reaction, blending, and the like.

The amount of solvent added to the plant particles generally ranges from about 100 to 1 and preferably from about 10 to about 1 parts by weight based upon 1 part by weight of said plant material.

Generally, the recovery yield of rubber from guayule plant material by the present invention is greater than that obtained with the use of a solvent consisting of only a hydrocarbon, with all other factors being equal. Since it is generally well known that the polar solvent does not tend to extract rubber, the result of the present invention is unexpected.

The time required for extraction is relatively short, being a matter of hours. Generally, a high degree of extraction occurs within two hours, and even in one hour. Although the net yield may not be as high, high recovery of extracted material is often obtained within thirty minutes. The extracting can occur in any storage tank, vessel or the like. Not only is the rubber and/or resin extracted, but various impurities such as bagasse, cork, pulp and dirt, due to gravitational action, settles to the bottom of the vessel. Since the rubber and/or resin solution is light, it generally floats to the top of the tank and is withdrawn therefrom. Moreover, inherent within the present invention is the capability of adding effective stabilizers as antidegradants to the resinous rubber solution. Moreover, the extraction can be carried out at moderate temperatures as from about 10° C. to about 60° C. with from about 20° C. to about 35° C. being preferred.

Since a monophase solvent is utilized, an alternative to the present invention is to utilize the solvent as in the fine grinding of the plant particles such that a simultaneous grind-extraction occurs. That is, a solvent-plant material slurry is made and fine ground in a high shear grinder to simultaneously extract rubber and/or resin during grinding thereof.

The invention will be better understood by reference to the following examples which are representative of the invention and do not limit the invention thereby. All parts and percentages are by weight and temperatures in degrees Celeius unless otherwise indicated.

EXPERIMENTAL TECHNIQUES

To demonstrate the invention, wild guayule shrub native to Texas was used. The guayule shrub was ground and reduced to a nominal ⅛ inch particle size by hammermilling the whole shrub, including leaves. Analysis of the ground shrub indicated the following:

| Dry Basis | |
|---|---|
| Moisture | 21.4 |
| Water Solubles | 11.9 |
| Acetone Solubles | 8.78 |
| Hexane Solubles | 7.19 |

For the sake of complete disclosure, the acetone soluble fraction is referred to as "available" guayule resin and the hexane solubles as "available" guayule rubber. It should be noted that based on the preceding definitions, complete recovery of resinous rubber would include the defined 8.78 percent acetone-soluble resin and 7.19 percent hexane-soluble guayule rubber, making a total extraction recovery of 15.9 percent on a dry basis.

To demonstrate the extraction efficiencies of various hexane/acetone monophase solvent systems, a standard total immersion procedure was used. This procedure comprises:

Approximately 10 to 15 lbs. of the hammer-milled ground guayule shrub was thoroughly mixed and 200 grams removed and charged to a glass jar. A total of 1,000 grams of hexane containing 0.50 grams of a paraphenylenediamine stabilizer was added. The sample was then slowly rotated at constant speed to effect mixing of the sample and extraction of resinous rubber, that is, resin and rubber. After specified times, rotation of the sample was stopped and the sample allowed to stand one hour to make sure shrub fines and dirt settled and that the clarified supernatant liquid was representative of resinous rubber/solvent only. A small aliquot of the clarified supernatant liquid was removed, weighed and the solvent evaporated, and reweighed. The percentage of non-volatile resinous rubber present in the original aliquot was then calculated. Based on the original 200 grams of shrub and 1,000 grams of hexane and comparison with the analysis of the shrub, a weight percent extraction efficiency was calculated.

As will be shown below, the extraction rate of resinous rubber was estimated by removing aliquots of the resinous rubber/solvent at different times to determine the extraction efficiencies as a function of time. When this procedure was used, the total sample was always corrected for the amount of solvent and resinous rubber removed so that an accurate as possible extraction efficiency could be calculated.

After the original sample had been analyzed for extraction efficiency of resinous rubber, the remaining sample was filtered through a 5 micron filter and the clarified filtrate allowed to stand until the volatile solvent had evaporated. The residue (resinous guayule rubber) was then analyzed for resin content by acetone extraction as well as for molecular weight of the contained rubber by the well-known gel permeation chromatographic procedure.

EXAMPLES

A series of experiments were conducted using the experimental techniques described above. The extracting solvents were varied in composition from commercial hexane to commercial acetone with selected intermediate monophase solvent systems composed of various hexane/acetone ratios by weight. The percentage of resinous rubber extracted as a function of time in these experiments is summarized in Table I.

Referring to the data in Table I, it will be noted that commercial hexane (Sample No. 1) yields a 69 percent extraction of resinous rubber after 30 minutes and 82 percent after three days. In contrast, the respective extraction efficiencies observed after 30 minutes for the 90/10, 80/20, 70/30 and 60/40 monophase solvent systems are 81 percent, 82 percent, 85 percent and 82 percent. After the indicated maximum number of days extraction, the extraction efficiencies range from 90 percent for the 90/10 hexane/acetone system to 101 percent for the 70/30 hexane/acetone system. Obviously, some experimental error is involved in these experiments (greater than 100 percent recovery in three experiments); however, a general trend can be noted toward greater extraction efficiencies of resinous rubber when monophase solvent systems of hexane/acetone ratios of 90/10 to 60/40 are used. (Sample Nos. 2 to 5) as compared to only hexane (Sample No. 1) and the lower hexane/aceton samples of 50/50 and 40/60 (Sample Nos. 6 and 7) as well as results on Sample No. 8 which utilized only commercial acetone as the extracting solvent. The extraction efficiencies of Sample No. 8 can be recalculated on the basis of extracting only guayule resin. The respective values are 82 percent, 83 percent and 88 percent after 30, 60 and 90 minutes extraction. These recalculated values are in accord with reports that acetone is a good solvent to deresinate guayule shrub. The efficiencies reported for Sample Nos. 6 and 7 can also be recalculated on the basis of extracting only resin to give relatively high resin extraction efficiencies. The values are actually higher than the results obtained with commercial acetone indicating that the presence of some hexane in acetone aids the extraction of relatively non-polar resinous fractions present in guayule resin.

As a whole, the data summarized in Table I, demonstrates that monophase solvent systems consisting of from about 90/10 to about 60/40 hexane/acetone by weight are superior extracting solvents for resinous guayule rubber as compared to hexane or acetone alone.

As stated above under "Experimental Techniques", the resinous rubber extracted in the experiments is recovered and analyzed for resin content. The resin contents of the various samples are recorded in Table II.

It should be stated that the percentage of resin in resinous rubber should be 55 percent if all of the resin and rubber are recovered from the shrub. Unfortunately, the standard procedure employed does not utilize flushing of the shrub with solvent to ensure that all of the resin and rubber are recovered. The samples are simply filtered and the resinous rubber recovered from the clarified filtrate.

The data in Table II shows, however, a definite trend toward higher resin-content resinous rubber with a decreasing hexane/acetone ratio for the respective extracting solvents. The products extracted with hexane/acetone ratios of 50/50, 40/60 and 0/100 are essentially rubber-free guayule resin.

The molecular weight of the rubber contained in the resinous rubber fractions are determined and the data summarized in Table III.

As shown by the data in Table III, the highest molecular weight (Mw) of the resinous rubber samples is of the order of 1.3 million. The Mw and Mn values on the hexane-extracted resinous rubber is slightly higher than the values observed on the hexane/acetone extracted samples. Surprisingly, the Mw and Mn values for the hexane/acetone extracted samples increase as the ratio of hexane/acetone decreases. The polydispersity values (Mw/Mn) indicate that the recovered guayule rubber had a relatively narrow molecular weight distribution.

As a whole, the data reported in Table III demonstrates that a commercially useful guayule rubber can be extracted from guayule shrub and, based on the data in Table I, a higher extraction yield of rubber realized using solvents composed of hexane/acetone ranging from about 5 to about 50 pbw acetone and about 95 to about 50 pbw hexane.

TABLE I

SOLVENT EXTRACTION OF GUAYULE SHRUB
WEIGHT PERCENT RESINOUS RUBBER EXTRACTED

| Extracting Solvent | SAMPLE NUMBERS | | | | | | | |
|---|---|---|---|---|---|---|---|---|
| Hexane/Acetone By Weight | 1<br>100/0 | 2<br>90/10 | 3<br>80/20 | 4<br>70/30 | 5<br>60/40 | 6<br>50/50 | 7<br>40/60 | 8<br>0/100 |
| Time; Minute | | | | | | | | |
| 30 | 69 | 81 | 82 | 85 | 82 | 56 | 52 | 45 |
| 60 | 72 | 81 | 84 | 86 | 84 | 56 | 55 | 46 |
| 90 | 74 | 81 | 84 | 87 | 85 | 56 | 54 | 49 |
| 120 | — | 83 | 84 | 88 | 87 | 56 | 58 | — |
| Days | | | | | | | | |
| 1 | 79 | 90 | 93 | 105 | 111 | — | — | — |

TABLE I-continued

SOLVENT EXTRACTION OF GUAYULE SHRUB
WEIGHT PERCENT RESINOUS RUBBER EXTRACTED

| Extracting Solvent Hexane/Acetone By Weight | SAMPLE NUMBERS | | | | | | | |
|---|---|---|---|---|---|---|---|---|
| | 1 100/0 | 2 90/10 | 3 80/20 | 4 70/30 | 5 60/40 | 6 50/50 | 7 40/60 | 8 0/100 |
| 2 | 81 | 91 | 96 | — | — | — | — | — |
| 3 | 82 | — | — | — | — | — | — | — |
| 4 | — | — | — | 101 | 99 | — | — | — |
| 5 | — | 90 | 94 | — | — | — | — | — |

TABLE II

WEIGHT PERCENT RESIN IN RESINOUS RUBBER[1]

| Extracting Solvent Hexane/Acetone By Weight | 100/0 | 90/10 | 80/20 | 70/30 | 60/40 | 50/50 | 40/60 | 0/100 |
|---|---|---|---|---|---|---|---|---|
| Weight of Resin | 31.6 | 30.8 | 34.0 | 42.4 | 41.6 | # | # | # |

Based on gpc results, samples contained only a trace of guayule rubber.
[1] Resinous rubber samples recovered from the extraction experiments recorded in Table I. The time of extraction is also recorded in Table I.

TABLE III

Effect of Hexane/Acetone Variation
On Molecular Weight of Extracted Rubber

| Extracting Solvent; Hexane/Acetone By Weight | Peak Mw Mw × 10-6 | M × 10$^{-3}$ | | |
|---|---|---|---|---|
| | | Mw | Mn | Mw/Mn |
| 100/0 | 1.3 | 503 | 384 | 1.31 |
| 90/10 | 1.2 | 408 | 230 | 1.77 |
| 80/20 | 1.3 | 413 | 256 | 1.61 |
| 70/30 | 1.3 | 458 | 311 | 1.47 |
| 60/40 | 1.3 | 485 | 364 | 1.33 |
| 50/50 | # | # | # | # |
| 40/60 | # | # | # | # |

Base on gpc results, samples contained only a trace of guayule rubber.

It is to be understood that the above examples are only representative of the present invention and do not limit the scope of the invention.

The extracted guayule rubber is fairly similar to cis 1,4-polyisoprene. Hence, can be utilized wherever natural or synthetic rubber is utilized, such as in tires, conveyor belts, etc., as well as in other rubber articles.

While the best mode and preferred embodiments have been set forth in detail, it is to be understood that the invention is not limited thereto, the scope of the invention being limited by the scope of the attached claims.

What is claimed is:

1. A process for extracting rubber and resin from rubber containing plants comprising the steps of:
   adding a monophase solvent to particles of the rubber containing plant, said monophase solvent comprising at least one hydrocarbon solvent, and at least one organic polar solvent, the amount of said hydrocarbon solvent ranging from about 90 to about 55 percent by weight and the amount of said organic polar solvent ranging from about 10 to about 45 percent by weight, said hydrocarbon solvent being selected from the group consisting of an alkane having from 5 to 9 carbon atoms, a cycloalkane having from 5 to 10 carbon atoms, an aromatic or an alkyl substituted aromatic compound having from 6 to 12 carbon atoms, and combinations thereof, and said polar solvent being selected from the group consisting of an alcohol having from 1 to 8 carbon atoms, an ester having from 3 to 8 carbon atoms, a ketone having from 3 to 8 carbon atoms, an ether having from 2 to 8 carbon atoms, and combinations thereof, and simultaneously extracting the rubber and the resin from said plant particles in a relatively short period of time.

2. A process according to claim 1, wherein the amount of said monophase solvent to said plant particles ranges from about 100 to 1 part by weight, based upon 1 part by weight of said plant particles, and wherein the recovery yield of said resin and rubber is at least 70% by weight.

3. A process according to claim 2, wherein said hydrocarbon solvent is selected from the group consisting of hexane, heptane, cyclohexane, cyclopentane, benzene, xylene, toluene, and combinations thereof and wherein said organic polar solvent is selected from the group consisting ethanol, isopropanol, the various formates, the various acetates, the various propionates, acetone, methyl ethyl ketone, dimethyl ether, diethyl ether, tetrahydrofuran, and combinations thereof.

4. A process according to claim 3, wherein said particles are guayule particles, wherein the amount of said hydrocarbon solvent ranges from about 85 percent to about 60 percent by weight and wherein the amount of organic polar solvent ranges from about 15 percent to about 40 percent by weight, carrying out said simultaneous extraction at a temperature of from about 10° C. to about 60° C., and wherein the amount of said monophase solvent to said plant particles is from about 10 to about 1 part by weight based upon 1 part by weight of said plant particles wherein said extraction substantially occurs within a time period of one hour.

5. A process according to claim 4, wherein said hydrocarbon solvent is hexane and wherein said polar solvent is acetone.

6. A process according to claim 5, wherein the amount of said hydrocarbon solvent is from about 75 percent to about 65 percent by weight and wherein the amount of said organic polar solvent is from about 25 percent to about 35 percent by weight, including withdrawing said extracted rubber and resin and wherein said extraction occurs within a time period of 30 minutes.

7. A process according to claim 1 including forming small particles from said rubber containing plant, said particles generally being of a size of 1.0" or smaller.

8. A process according to claim 2, including forming small particles from said rubber containing plant, said particles generally being of a size of 1.0" or smaller.

9. A process according to claim 3, including forming small particles from said rubber containing plant, said particles generally being of a size of 1.0" or smaller.

10. A process according to claim 6, including forming small particles from said rubber containing plant, said particles generally being of a size of $\frac{1}{8}$" or smaller.

* * * * *